(12) United States Patent
Bläsing et al.

(10) Patent No.: US 6,664,536 B2
(45) Date of Patent: Dec. 16, 2003

(54) METHOD FOR EVALUATING THE SIGNALS OF AN OPTOELECTRONIC DISPLACEMENT OR ANGLE MEASURING DEVICE AND IMPLEMENTATION OF SAID METHOD

(75) Inventors: Frank Bläsing, Werl (DE); Christian Schirp, Bochum (DE)

(73) Assignee: Leopold Kostal GmbH & Co. KG, Ludenscheid (DE)

(*) Notice: Subject to any disclaimer, the term of this patent is extended or adjusted under 35 U.S.C. 154(b) by 0 days.

(21) Appl. No.: 10/243,609

(22) Filed: Sep. 13, 2002

(65) Prior Publication Data

US 2003/0038232 A1 Feb. 27, 2003

Related U.S. Application Data

(63) Continuation of application No. PCT/EP01/12393, filed on Oct. 26, 2001.

(30) Foreign Application Priority Data

Nov. 15, 2000 (DE) .......................................... 100 56 605

(51) Int. Cl.⁷ ............................ G01D 5/34; H03M 1/22
(52) U.S. Cl. ...................... 250/231.14; 341/13; 701/41
(58) Field of Search ...................... 250/231.13–231.18; 341/11, 13, 31; 701/41, 48

(56) References Cited

U.S. PATENT DOCUMENTS

| 5,332,895 A | 7/1994 | Rieder et al. |
| 5,773,820 A | 6/1998 | Osajda et al. |
| 6,459,389 B1 * | 10/2002 | Germuth-Loffler et al. ... 341/13 |

FOREIGN PATENT DOCUMENTS

| DE | 32 34 330 A1 | 9/1982 |
| DE | 34 90 596 C2 | 10/1984 |
| DE | 37 36 704 C2 | 10/1987 |
| DE | 42 25 320 C1 | 7/1992 |
| DE | 195 28 704 A1 | 8/1995 |
| DE | 196 38 912 A1 | 9/1996 |

* cited by examiner

Primary Examiner—Stephone B Allen
(74) Attorney, Agent, or Firm—Brooks Kushman P.C.

(57) ABSTRACT

A method for evaluating a code signal generated by an encoder having code and reference tracks. The encoder is interposed between a light and a light sensor and moves relative to the light and the sensor such that the code and reference tracks transmit light from the light onto the sensor. The sensor generates the code signal as a function of the light transmitted by the code track which is received by sensor transducers. The method includes capturing and evaluating the amplitude of a reference signal generated as a function of the light transmitted by the reference track which is received by sensor transducers. A measurement parameter relevant for evaluating the amplitude of the code signal is then adapted on the basis of the evaluation of the amplitude of the reference signal in order to compensate the evaluation of the code signal to changing measurement conditions.

19 Claims, No Drawings

METHOD FOR EVALUATING THE SIGNALS OF AN OPTOELECTRONIC DISPLACEMENT OR ANGLE MEASURING DEVICE AND IMPLEMENTATION OF SAID METHOD

CROSS-REFERENCE TO RELATED APPLICATIONS

This is a continuation of International Application PCT/EP01/12393, published in German, with an international filing date of Oct. 26, 2001.

BACKGROUND OF THE INVENTION

1. Field of the Invention

The invention relates to a method for evaluating the signal of an optoelectronic position and angular position measuring device with an encoder disk that can move relative to transceiver having a light source and a sensor array provided with a number of optoelectronic transducers. The invention also relates to a preferred use of such a process.

2. Background Art

Position and angular position measuring devices are frequently used for automatic positioning and measurement in machine tools and in coordinate measuring instruments. For example, rotation angle sensors are used in the area of motor vehicles to determine the absolute angular position of the steering wheel, and thus they are also called steering angle sensors. Such optoelectronic steering angle sensors essentially include a rotor and a stator. The rotor is an encoder disk coupled to the rotational motion of the steering wheel and the stator is a transceiver. The encoder disk includes a light source, for example an LED system, located on one side of the encoder disk. A receiving device, such as a line sensor having numerous adjacent transducers, is located on the other side of the encoder disk. From time to time, the coding used by the encoder disk is a digital code which includes several parallel code tracks and is built, for example, in the manner of a Gray code.

A value for the steering angle is needed in motor vehicles, for example, for use by a vehicle movement dynamics control system. In addition to the mentioned steering angle values, such a vehicle movement dynamics control system receives other measurement data, such as the wheel speed or the rotation of the motor vehicle about its vertical axis. The absolute steering angle and the steering speed are needed so that these values, along with the other captured data, can be evaluated by the vehicle movement dynamics control system and converted to control actuators such as the brakes and/or the engine management system.

Previously known position and angular position measuring devices evaluate the signal amplitudes of the transducers assigned to each code track by comparing the signal amplitude with a specified signal threshold. If the signal threshold is exceeded, the signal amplitude of the transducers assigned to this code track is evaluated as exposed by the coding of the code track. If the signal amplitude is smaller than the specified signal threshold, an evaluation is made that the coding of this code track is not causing exposure of the transducers assigned to this code track.

Assignment of certain transducers to a code track is used in the previously known process to compensate play of the encoder disk in its movement relative to the transceiver. For this purpose, the coding has at least one reference track assigned to it. Because the distance from the code tracks to the reference track is the same over the length of the code tracks, it can be determined which code track is exposing which transducers by determining the position of the reference track on the sensor array.

Although the previously known process can achieve sufficiently precise results when the conditions which have an influence on signal detection remain constant, such position and angular position measuring devices can provide incorrect measurement results if, for example, environmental influences should change the idealized measurement parameters specified during the design of the position or angular position measuring device. Especially when such an angular position measuring device is used as a steering angle sensor in a motor vehicle, exact angle detection should be ensured under the most diverse influences.

For example, such a measuring system can be affected by stray light, or by the encoder disk being covered with condensation or ice or even dust, and the signal threshold is often exceeded in the examples mentioned not only when there is an actual direct exposure by the coding of a code track, but rather also due to stray light exposing the transducer elements assigned to such a code track. In a corresponding manner, it is also possible for the signal threshold not to be exceeded despite being exposed by the coding of a code track, when there is dust, for example. In these cases the angle value read from a steering angle sensor is faulty; accordingly, the subsequent evaluations and analyses based on this value are also faulty.

SUMMARY OF THE INVENTION

Therefore, starting from this prior art that has been discussed, the invention is based on the task of further developing a process of the type mentioned at the beginning in such a way that it is able to avoid the disadvantages shown above, at least as much as possible.

This task is solved according to the invention by the fact that the method contains steps which make it possible for the evaluation and/or analysis of at least one measurement parameter of the signal amplitude produced when a transducer of the sensor array is exposed to be adapted to changing measurement conditions. The steps of the method include:

capturing the amplitude of a reference signal;

evaluating the amplitude of the reference signal; and adapting at least one of the parameters that is relevant for evaluating the amplitude.

DETAILED DESCRIPTION OF THE PREFERRED EMBODIMENT(S)

The process according to the invention compensates for changing measurement conditions by adapting at least one of the measuring system's parameters that is relevant for evaluating the amplitude. This is done by capturing the amplitude of a reference signal in addition to the signal of the at least one code track.

In principle, the reference signal can be provided by any coding of the encoder disk which exposes transducers of the sensor array that are specified through several code steps. It is expedient, when using such a reference signal, for the actual reference signal to comprise only those areas in which appropriate setting of the encoder disk ensures that the transducers assigned to this code track are actually exposed. However, in another embodiment, the reference signal can also be provided by one of the encoder disk's own tracks, where the reference track(s) that are especially suitable for this purpose are those which are usually also made to compensate for movements of the encoder disk in the transverse direction to the extent of the coding.

In another process step, the signal amplitude of the reference signal is evaluated and compared, possibly with an absolute value or with previously recorded and stored reference signal amplitudes. Next, at least one of the parameters that is relevant for evaluating the amplitude is adapted on the basis of the result of the evaluation of the signal amplitude of the reference signal. For example, if the amplitude of the reference signal is less than its earlier amplitudes and if this is due, for example, to condensation on the encoder disk or to the deposit of dust on the encoder disk, this can be compensated for by increasing the exposure time or the number of measurement steps necessary for capturing a signal amplitude, which are parameters that are relevant for evaluating the signal amplitudes. It is also possible to increase the luminosity of the light source, so that after this adaptation the reference signal's amplitude once again has the value that was originally set.

The sensitivity of adaptation can be handled in different ways. For example, the step of evaluating the reference signal's amplitude can include averaging over a certain number of measurement steps. This means that the system's adaptation is damped according to the principle of a moving average. When the process is handled in this way, the adaptation time is slower—as a function of the desired number of measurement steps—than it is in a system in which adaptation occurs at every measurement step. The parameter that is relevant for evaluating the signal is adapted as a function of the average that is calculated.

The evaluation of the reference signal's amplitude can also include comparison with a reference signal amplitude, e.g., one or more preceding ones, e.g., in order to be able to document the course of the changes and possibly to be able to make an extrapolation concerning the size of future changes.

An expedient further development involves expanding the process according to the invention in such a way that the signal amplitudes of the transducers assigned to a code track are evaluated by determining the relative difference in brightness between the code track signal (which is relatively brighter when there is an exposure) and a non-track signal (which is relatively darker), and, on the basis of the difference in brightness that is found, making a determination about whether or not the transducers assigned to the code track are exposed by the coding.

This process involves evaluating the signal amplitude assigned to a code track by determining the relative difference in brightness between the code track signal (which is relatively brighter when there is an exposure) and a non-track signal (which is relatively darker compared with it). Thus, in principle the evaluation is independent of a signal threshold that takes into account only the absolute signal amplitude. The evaluation of signal amplitudes is more sensitive this way, so that the decision threshold can be established at a substantially lower level.

This method makes it possible to compensate for environmental influences by relative evaluation. If there should be a reduction, which might also possibly be only local, in the luminosity exposing the sensor array's transducers—which would mean that the signal would no longer be recognized using the prior art, for example—there still remains a detectable contrast between a code track or code track section exposing certain of the sensor array's transducers and the non-track sections not exposed by these code tracks, so that the desired evaluation can be carried out without limitations. The signals of a code track are then evaluated as a function of the difference in brightness that is found between the code track signal (which is relatively brighter when there is an exposure) and a non-track signal (which is relatively darker) by determining whether or not the transducers assigned to the at least one code track are exposed by the coding.

The difference in brightness between the signals of a code track and a non-code track can be determined, for example, by considering the difference in these signal amplitudes, with a specified difference in brightness serving as a signal threshold. However, the relative difference in brightness of the two signal amplitudes can also be determined by dividing one by the other, with a specified ratio then serving as a signal threshold.

A relatively darker non-code track can be provided by a dark track which remains the same over the possible amount of movement of the encoder disk and which is located next to the digital coding, for example. However, it is also possible, if several parallel code tracks are used, to use the intermediate spaces between the code tracks, which are present anyway, as so-called intermediate tracks, in order to evaluate the sensor array's transducers assigned to these intermediate tracks as non-track signals. However, under especially unfavorable, low-contrast measurement conditions, it can happen, when the two neighboring code tracks are exposed, that the sensor array's transducers which are provided for capturing a non-track signal are exposed with about the same brightness.

Consequently, when there is an exposure, the resulting contrast between the intermediate track signal and the code track signal is very small, under some circumstances too small to be able to conclude that there has been exposure of the transducers assigned to the two code tracks. In such cases, an exact measurement result can still be achieved if a correspondingly darker signal is used as a non-track signal. It is also possible in addition to set an absolute signal threshold at a relatively high level, so that it is possible to conclude that there has been an exposure of the transducers assigned to the one code track if either the relative difference in brightness between the amplitude of the code track signal and a non-track signal is correspondingly large or the signal amplitude of the transducers assigned to a code track exceeds the absolute signal threshold.

While embodiments of the invention have been described, it is not intended that these embodiments describe all possible forms of the invention. Rather, the words used in the specification are words of description rather than limitation, and it is understood that various changes may be made without departing from the spirit and scope of the invention.

What is claimed is:

1. A method for evaluating a code signal generated by a position measuring system having an encoder with at least one code track and a reference track in which the encoder is interposed between a light source and a light sensor and moves relative to the light source and the light sensor such that the at least one code track and the reference track transmit light from the light source onto the light sensor when the encoder is in a given position relative to the light source, wherein the light sensor generates the code signal as a function of the light transmitted by the at least one code track which is received by transducers of the light sensor, the method comprising the steps of:

(A) capturing the amplitude of a reference signal generated as a function of the light transmitted by the reference track which is received by transducers of the light sensor;

(B) evaluating the amplitude of the reference signal; and
(C) adapting at least one measurement parameter that is relevant for evaluating the amplitude of the code signal on the basis of the evaluation of the amplitude of the reference signal in order to compensate the evaluation of the code signal to changing measurement conditions, wherein the step of adapting includes modifying the exposure time of the light sensor.

2. The method of claim 1 wherein:
step (B) includes averaging the amplitude of the reference signal over a determined number of measurement steps, wherein the at least one measurement parameter that is adapted is adapted on the basis of the average amplitude of the reference signal.

3. The method of claim 1 wherein:
step (B) includes comparing the amplitude of the reference signal with a previous value of the amplitude of the reference signal.

4. The method of claim 1 wherein:
step (C) includes modifying the luminosity of the light source.

5. The method of claim 1 wherein:
step (C) includes modifying a signal threshold used to determine whether the light sensor transducers assigned to the code track of the encoder are exposed to the light source by the code track.

6. The method of claim 1 wherein:
the position measuring system is an optoelectronic steering angle sensor for use in a motor vehicle.

7. The method of claim 1 wherein:
the position measuring system is an optoelectronic steering angle sensor for use in a motor vehicle.

8. The method of claim 1 further comprising:
(D) determining brightness of a code track signal generated by light sensor transducers assigned to a code track of the encoder;
(E) determining brightness of a non-code track signal generated by light sensor transducers assigned to a non-code track section of the encoder; and
(F) determining relative brightness between the code and non-code track signals.

9. The method of claim 8 further comprising:
(G) determining whether the light sensor transducers assigned to the code track of the encoder are exposed to the light source as a function of the relative brightness.

10. The method of claim 9 wherein:
steps (D) and (E) include determining amplitudes of the code and non-code track signals, wherein step (F) includes determining the difference in the amplitudes of the code and non-code track signals, wherein step (G) includes determining the light sensor transducers assigned to the code track of the encoder as being exposed to the light source if the difference of the code and non-code track signals is greater than a signal threshold.

11. The method of claim 9 wherein:
steps (D) and (E) include determining amplitudes of the code and non-code track signals, wherein step (F) includes determining the ratio of the amplitude of the code track signal over the amplitude of the non-code track signal, wherein step (G) includes determining the light sensor transducers assigned to the code track of the encoder as being exposed to the light source if the ratio of the amplitudes of the code and non-code track signals is greater than a signal threshold.

12. The method of claim 9 wherein:
step (G) includes determining the light sensor transducers assigned to the code track of the encoder as being exposed to the light source if the amplitude of the code track signal is greater than a specified absolute signal threshold.

13. A method for evaluating a code signal generated by a position measuring system having an encoder with at least one code track and a reference track in which the encoder is interposed between a light source and a light sensor and moves relative to the light source and the light sensor such that the at least one code track and the reference track transmit light from the light source onto the light sensor when the encoder is in a given position relative to the light source, wherein the light sensor generates the code signal as a function of the light transmitted by the at least one code track which is received by transducers of the light sensor, the method comprising the steps of:
(A) capturing the amplitude of a reference signal generated as a function of the light transmitted by the reference track which is received by transducers of the light sensor;
(B) evaluating the amplitude of the reference signal;
(C) adapting at least one measurement parameter that is relevant for evaluating the amplitude of the code signal on the basis of the evaluation of the amplitude of the reference signal in order to compensate the evaluation of the code signal to changing measurement conditions;
(D) determining brightness of a code track signal generated by light sensor transducers assigned to a code track of the encoder;
(E) determining brightness of a non-code track signal generated by light sensor transducers assigned to a non-code track section of the encoder;
(F) determining relative brightness between the code and non-code track signals; and
(G) determining whether the light sensor transducers assigned to the code track of the encoder are exposed to the light source as a function of the relative brightness.

14. The method of claim 13 wherein:
steps (D) and (E) include determining amplitudes of the code and non-code track signals, wherein step (F) includes determining the difference in the amplitudes of the code and non-code track signals, wherein step (G) includes determining the light sensor transducers assigned to the code track of the encoder as being exposed to the light source if the difference of the code and non-code track signals is greater than a signal threshold.

15. The method of claim 13 wherein:
steps (D) and (E) include determining amplitudes of the code and non-code track signals, wherein step (F) includes determining the ratio of the amplitude of the code track signal over the amplitude of the non-code track signal, wherein step (G) includes determining the light sensor transducers assigned to the code track of the encoder as being exposed to the light source if the ratio of the amplitudes of the code and non-code track signals is greater than a signal threshold.

16. The method of claim 13 wherein:
step (G) includes determining the light sensor transducers assigned to the code track of the encoder as being exposed to the light source if the amplitude of the code track signal is greater than a specified absolute signal threshold.

17. The method of claim 13 wherein:
step (B) includes comparing the amplitude of the reference signal with a previous value of the amplitude of the reference signal.

18. The method of claim 13 wherein:
step (C) includes modifying the luminosity of the light source.

19. The method of claim 13 wherein:
step (C) includes modifying a signal threshold used to determine whether the light sensor transducers assigned to the code track of the encoder are exposed to the light source by the code track.

* * * * *